(12) United States Patent
Toyama et al.

(10) Patent No.: US 8,039,536 B2
(45) Date of Patent: Oct. 18, 2011

(54) INTERLAYER FILM FOR LAMINATED GLASS AND LAMINATED GLASS

(75) Inventors: Kiyofumi Toyama, Koka-Gun (JP); Yoshio Aoshima, Shiga (JP); Chikao Shimizu, Shiga (JP)

(73) Assignee: Sekisui Chemical Co., Ltd., Osaka-shi (JP)

( * ) Notice: Subject to any disclaimer, the term of this patent is extended or adjusted under 35 U.S.C. 154(b) by 0 days.

(21) Appl. No.: 12/950,526

(22) Filed: Nov. 19, 2010

(65) Prior Publication Data
US 2011/0064957 A1    Mar. 17, 2011

Related U.S. Application Data

(63) Continuation of application No. 11/646,320, filed on Dec. 28, 2006, now Pat. No. 7,858,683, which is a continuation of application No. 11/113,080, filed on Apr. 25, 2005, now abandoned, which is a continuation of application No. 10/220,197, filed as application No. PCT/JP01/01620 on Mar. 2, 2001, now Pat. No. 6,903,152.

(30) Foreign Application Priority Data

Mar. 2, 2000 (JP) .................................. 2000-057419

(51) Int. Cl.
 C08K 3/10 (2006.01)
 D06M 15/693 (2006.01)
 B32B 5/16 (2006.01)
 B32B 17/10 (2006.01)
 B32B 27/42 (2006.01)
 G11B 11/105 (2006.01)

(52) U.S. Cl. ........ 524/403; 524/394; 428/330; 428/339; 428/332; 428/436; 428/437

(58) Field of Classification Search .................. 524/403, 524/394; 428/330, 339, 332, 436, 437
See application file for complete search history.

(56) References Cited

U.S. PATENT DOCUMENTS
5,380,597 A    1/1995 Klang et al.
(Continued)

FOREIGN PATENT DOCUMENTS
EP    0457190 A1    11/1991
(Continued)

OTHER PUBLICATIONS

Office Action on a counterpart JP Application No. 2007-289973, which was received on Jan. 19, 2010.
(Continued)

Primary Examiner — William Cheung
(74) Attorney, Agent, or Firm — Connolly Bove Lodge & Hutz LLP

(57) ABSTRACT

The invention provides an interlayer film for a laminated glass and a laminated glass, which are protected against a slump in TL value through attenuation of said coincidence effect and adapted to display an outstanding sound insulation performance over a broad temperature range. An interlayer film for a laminated glass comprising a plasticizer and a polyacetal resin, which is a blend of a polyacetal resin having an average polymerization degree of 1,000 to 3,000 and a polyacetal resin having an average polymerization degree of 3,000 to 5,000, and which has an acetalization degree of 60 to 85 mol % and an acetyl group content of 8 to 30 mol %. An interlayer film for a laminated glass which shows a temperature dependence of loss tangent in which the lowest-temperature side maximum of loss tangent appears at 30° C. or lower when examined for dynamic viscoelasticity.

2 Claims, 1 Drawing Sheet

U.S. PATENT DOCUMENTS

| | | | |
|---|---|---|---|
| 5,567,529 A | 10/1996 | Smith | |
| 6,903,152 B2 * | 6/2005 | Toyama et al. | 524/403 |
| 7,858,683 B2 * | 12/2010 | Toyama et al. | 524/403 |
| 2002/0006508 A1 * | 1/2002 | Shichiri et al. | 428/339 |

FOREIGN PATENT DOCUMENTS

| | | | |
|---|---|---|---|
| EP | 0566890 A1 * | 3/1993 | |
| EP | 0566890 A | 10/1993 | |
| EP | 07-10545 A1 | 5/1996 | |
| EP | 0727306 A2 | 8/1996 | |
| EP | 0852999 A2 | 7/1998 | |
| JP | 51-106190 | 9/1976 | |
| JP | 10-25390 A | 1/1989 | |
| JP | 2-229742 | 9/1990 | |
| JP | 4-254444 | 9/1992 | |
| JP | 7-503414 | 6/1993 | |
| JP | 5-330864 | 12/1993 | |
| JP | 6-000926 A | 1/1994 | |
| JP | 6-80446 | 3/1994 | |
| JP | 6-135748 A | 5/1994 | |
| JP | 08-109048 | 4/1996 | |
| JP | 09-109048 A | 4/1996 | |
| JP | 8-259279 A | 10/1996 | |
| JP | 08-337446 | 12/1996 | |
| JP | 9-040444 | 2/1997 | |
| JP | 10-1335 | 1/1998 | |
| JP | 10-025390 | * 1/1998 | |
| JP | 10-36146 | 2/1998 | |
| JP | 10-316454 | 12/1998 | |
| JP | 11-322378 | 11/1999 | |
| JP | 2000-272936 | 10/2000 | |
| JP | 2001-048601 A | 2/2001 | |
| JP | 2001-206742 A | 7/2001 | |
| WO | WO-93/10973 | 6/1993 | |

OTHER PUBLICATIONS

Office Action issued in counterpart EP Application No. 06024821.8, which was received May 31, 2010.

Extended European Search Report issued in counterpart EP Application No. 10011259.8, dated Jan. 18, 2011.

* cited by examiner

INTERLAYER FILM FOR LAMINATED GLASS AND LAMINATED GLASS

CROSS REFERENCE TO RELATED APPLICATIONS

This application is a continuation of Application No. 11/646,320, filed on Dec. 28, 2006, which is a Continuation application of U.S. application Ser. No. 11/113,080 filed Apr. 25, 2005 (abandoned), which is a continuation of Application No. 10/220,197 filed Aug. 29, 2002 (now U.S. Pat. No. 6,903,152), which is a 371 national stage of PCT/JP01/01620 filed Mar. 2, 2001, which in turn claims priority under 35 USC 119 from Japanese patent application 2000-57419, filed Mar. 2, 2000, the disclosures of which are incorporated herein by reference.

TECHNICAL FIELD

The present invention relates to an interlayer film for a laminated glass having good moisture resistance, high resistance to panel shear and foaming at high temperature, ease of handling, excellent sound insulation performance, and even good heat insulation and electromagnetic wave permeability and to a laminated glass incorporating the same.

BACKGROUND ART

Generally a laminated glass consisting of a pair of glass panels and an interlayer film sandwiched between the panels is laudable in safety because even on breakage its fragments do not scatter so that it is in broad use for the glazing of road vehicles such as automobiles and of buildings, among other uses.

Among such interlayer films available for laminated glass use, an interlayer film made of a poly(vinyl butyral) resin plasticized by addition of a plasticizer has excellent adhesion to glass, high tensile strength, and good transparency so that a laminated glass fabricated by using this interlayer film is particularly suited for the glazing of automobiles.

Generally, the sound insulation performance is expressed in terms of frequency-dependent transmission loss, and JIS A 4708 specifies the transmission loss for each sound insulation grade by a given value over the frequency range of 500 Hz and up as indicated by a solid line in FIG. 1. Meanwhile, the sound insulation performance of glass sheet is considerably sacrificed by a coincidence effect in the frequency region around 2000 Hz as shown by a wavy line in FIG. 1.

The valley of the wavy line in FIG. 1 corresponds to a slump in sound insulation performance due to this coincidence effect and indicates that this material does not exhibit the required sound insulation performance.

Incidentally, the coincidence effect is a phenomenon such that when a sound wave enters a glass sheet, a transverse wave propagates on the glass surface owing to the rigidity of the glass and inertia, and the resulting resonance between the transverse wave and the incident sound wave causes a transmission of sound.

The conventional laminated glass is satisfactory in the protection against scattering of fragments but, in the aspect of sound insulation performance, is not free from deterioration in this performance due to said coincidence effect in the frequency band around 2000 Hz and, therefore, an improvement in this aspect has been awaited.

Meanwhile, from the equivalent loudness curve, the human ear is known to have a remarkably high sensitivity over the range of 1000 to 6000 Hz as compared with the other frequency range and this indicates that it is of great importance to a satisfactory sound insulation to get rid of the above slump in sound insulation performance due to the coincidence effect.

In order that the sound insulation performance of a laminated glass may be improved, it is necessary to attenuate the above coincidence effect to prevent said slump in the minimal part of transmission loss which arises from the coincidence effect (hereinafter the transmission loss in this minimal part will be referred to as TL value; FIG. 1).

As a means for preventing the slump in TL value, there has been proposed many measures, such as increasing the mass of laminated glass, a multi-layer glass construction, division of the glass area, and improving the glass panel-supporting structure, among others. However, these means are not only more or less unsatisfactory in effect but not available at commercially acceptable cost.

The requirements about sound insulation performance are getting more and more rigorous lately and taking architectural glazing materials as an example, the glass is required to have high sound insulation around room temperature. Thus, the required good sound insulation performance is such that the temperature corresponding to the highest sound insulation performance as determined by plotting transmission loss (TL value) against temperature (maximum sound insulation temperature=TLmax temperature) is in the neighborhood of room temperature and that the maximum value of sound insulation performance (maximum sound insulation value=TLmax value) itself is large. The same is true of road vehicles. Thus, including the wind-cutting sound at high-speed driving, vibrations from the engine assembly, etc., the number of sources of noise calling for a high level of sound insulation has been on the increase.

Furthermore, laminated glasses in these applications are actually exposed to a marked fluctuation of ambient temperature from a low temperature region to a high temperature region so that a satisfactory sound insulation performance is required not only in the neighborhood of room temperature but also over a broad temperature range.

However, the conventional laminated glass fabricated by using an interlayer film made of plasticized poly(vinyl butyral) resin has the disadvantage that its maximum sound insulation temperature is higher than room temperature and its sound insulation performance in the neighborhood of room temperature is poor.

Moreover, if an attempt is made to insure a satisfactory sound insulation performance, the interlayer film has to be soft enough so that when assembled with glass panels to fabricate a laminated glass, such troubles as panel shear and foaming tend to take place.

As the prior art interlayer film designed to improve the sound insulation performance of a laminated glass, Japanese Kokai Publication Hei-02-229742 discloses an polymer layer with glass transition temperature of not higher than 15° C., for example an interlayer comprising a laminate consisting of a vinyl chloride-ethylene-glycidyl methacrylate copolymer film and a plasticized poly(vinyl acetal) film.

This interlayer, however, is not only incapable of showing a sound insulation performance over Ts-35 on the sound insulation grade according to JIS A 4706 but also limited in the temperature range in which sound insulation performance is exhibited, failing to show a satisfactory sound insulation performance over a broad temperature range.

There has also been proposed an interlayer film for a laminated glass which comprises a poly(vinyl acetal) resin with an acetalization degree of 60 to 85 mol % and an acetyl group content of 8 to 30 mol %, the combined total of said acetalization degree and acetyl group content being not less than 75 mol %, and a plasticizer which, in the presence of the resin, shows a cloud point of not higher than 50° C. This interlayer film has certainly been improved in the aspects of sound insulation performance and temperature dependence of the performance but because the film is soft, it has the drawback that, when assembled with glass panels to fabricate a laminated glass, such troubles as panel shear and foaming tend to occur.

Japanese Kokai Publication Sho-51-106190 proposes a composition having a damping function over a broad temperature range as fabricated by laying up two or more kinds of resins varying in glass transition temperature. It is stated that this composition has an improved damping function over a broad temperature range. However, it is not obvious from the description whether this composition ever has properties required of laminated glass such as the sound insulation properties and transparency, and, moreover, this composition does not satisfy the requirements necessary for a safety glass, namely high impact energy absorbency and prevention of fragment scattering in the event of glass breakage.

Japanese Kokai Publication Hei-04-254444 proposes an interlayer fabricated by laminating a film consisting of a poly(vinyl acetal) containing acetal groups of 6 to 10 carbon atoms and a plasticizer with a film consisting of a poly(vinyl acetal) containing acetal groups of 1 to 4 carbon atoms and a plasticizer. This interlayer has a definitely improved sound insulation performance with little temperature-dependent variation but these improvements are still insufficient.

Thus, none of the above prior art interlayer films have satisfactory physical properties or are fully qualified to provide for laminated glass products showing a fully satisfactory sound insulation performance over a broad temperature range.

SUMMARY OF THE INVENTION

In the light of the above state of the art, the present invention has for its object to provide an interlayer film for a laminated glass which, without being compromised on the basic functional characteristics required of laminated glass such as transparency, weatherability, impact energy absorbency, and adhesion to glass or on interlayer film moldability and ease of handling, is protected against a slump in TL value through attenuation of said coincidence effect, adapted to display an outstanding and steady sound insulation performance over a broad temperature range on a long-term basis, and owing to satisfactory physical properties further protected against panel shear and foaming. It is another object of the invention to provide a laminated glass fabricated by using said interlayer film.

The first aspect of the present invention, is concerned with an interlayer film for a laminated glass comprising a poly(vinyl acetal) resin (C), which is a blend of a poly(vinyl acetal) resin (A) and a poly(vinyl acetal) resin (B), and a plasticizer, said poly(vinyl acetal) resin (A) having an average polymerization degree 1,000 to 3,000, said poly(vinyl acetal) resin (B) having an average polymerization degree 3,000 to 5,000, the difference in the average polymerization degree between said poly(vinyl acetal) resin (A) and poly(vinyl acetal) resin (B) being not less than 1,500, said poly(vinyl acetal) resin (C) having an acetalization degree of 60 to 85 mol % and an acetyl group content of 8 to 30 mol %, the combined total of said acetalization degree and acetyl group content being not less than 75 mol %, and the cloud point of a solution prepared by dissolving 8 weight parts of the poly(vinyl acetal) resin (C) in 100 weight parts of the plasticizer being not higher than 50° C.

The present invention relates, in the second aspect, to an interlayer film for a laminated glass which comprises a laminate of films each comprising a poly(vinyl acetal) resin plasticized with at least one kind of plasticizer selected from the group consisting of triethylene glycol di-2-ethylhexanoate, tetraethylene glycol di-2-ethylhexanoate, triethylene glycol di-n-heptanoate, and tetraethylene glycol di-n-heptanoate, and which shows a temperature dependence of loss tangent in which the lowest-temperature side maximum of loss tangent appears at 30° C. or lower when examined for dynamic viscoelasticity.

In the second aspect of the present invention, at least one constituent layer is preferably such that the cloud point of a solution prepared by dissolving 8 weight parts of the poly(vinyl acetal) resin in 100 weight parts of the plasticizer is not higher than 50° C.

In the second aspect of the present invention, it is preferable that the amount of the plasticizer relative to 100 weight parts of the poly(vinyl acetal) resin is larger in at least one constituent layer than that in the other layer or layers by not less than 5 weight parts.

In the second aspect of the present invention, at least one constituent layer is preferably such that the poly(vinyl acetal) resin has an average polymerization degree of not less than 1,500, an acetalization degree of 60 to 85 mol % and an acetyl group content of 8 to 30 mol %, with the combined total of said acetalization degree and acetyl group content being not less than 75 mol %.

The second aspect of the present invention is preferably such that at least one constituent layer comprises a poly(vinyl acetal) resin (C) derived from a polyvinyl alcohol) resin which is a blend of a polyvinyl alcohol) resin (A) and a poly(vinyl alcohol) resin (B), and a plasticizer, the difference in the average polymerization degree between said poly(vinyl alcohol) resin (A) and said poly(vinyl alcohol) resin (B) being not less than 500, said poly(vinyl acetal) resin (C) having an acetalization degree of 60 to 85 mol % and an acetyl group content of 8 to 30 mol %, with the combined total of said acetalization degree and acetyl group content being not less than 75 mol % or that at least one constituent layer comprises a poly(vinyl acetal) resin (F), which is a blend of a poly(vinyl acetal) resin (D) and a poly(vinyl acetal) resin (E), and a plasticizer, the difference in the average polymerization degree between said poly(vinyl acetal) resin (D) and said poly(vinyl acetal) resin (E) being not less than 500, and said poly(vinyl acetal) resin (F) having an acetalization degree of 60 to 85 mol % and an acetyl group content of 8 to 30 mol %, with the combined total of said acetalization degree and acetyl group content being not less than 75 mol %. More preferably, the average polymerization degree of said poly(vinyl alcohol) resin (A) is 500 to 3,000, the average degree of said poly(vinyl alcohol) resin (B) is 3,000 to 5,000, or the average polymerization degree of said poly(vinyl acetal) resin (D) is 500 to 3,000 and the average polymerization degree of said poly(vinyl acetal) resin (E) is 3,000 to 5,000.

In the second aspect of the present invention, it is preferable that at least one constituent layer comprises a poly(vinyl acetal) resin which contains a metal oxide microparticle having a heat ray-shielding function.

It is preferable that each of the first and the second aspects of the present invention further comprise a polyester film as additionally laminated.

In the first and the second aspects of the present invention, the poly(vinyl acetal) resin is preferably a poly(vinyl butyral) resin.

A laminated glass as fabricated by interposing the interlayer film for a laminated glass according to the first and the second aspects of the invention between at least a pair of glass panels and laminating them into an integral sheet also constitutes another aspect of the present invention.

DISCLOSURE OF INVENTION

Figure 1:
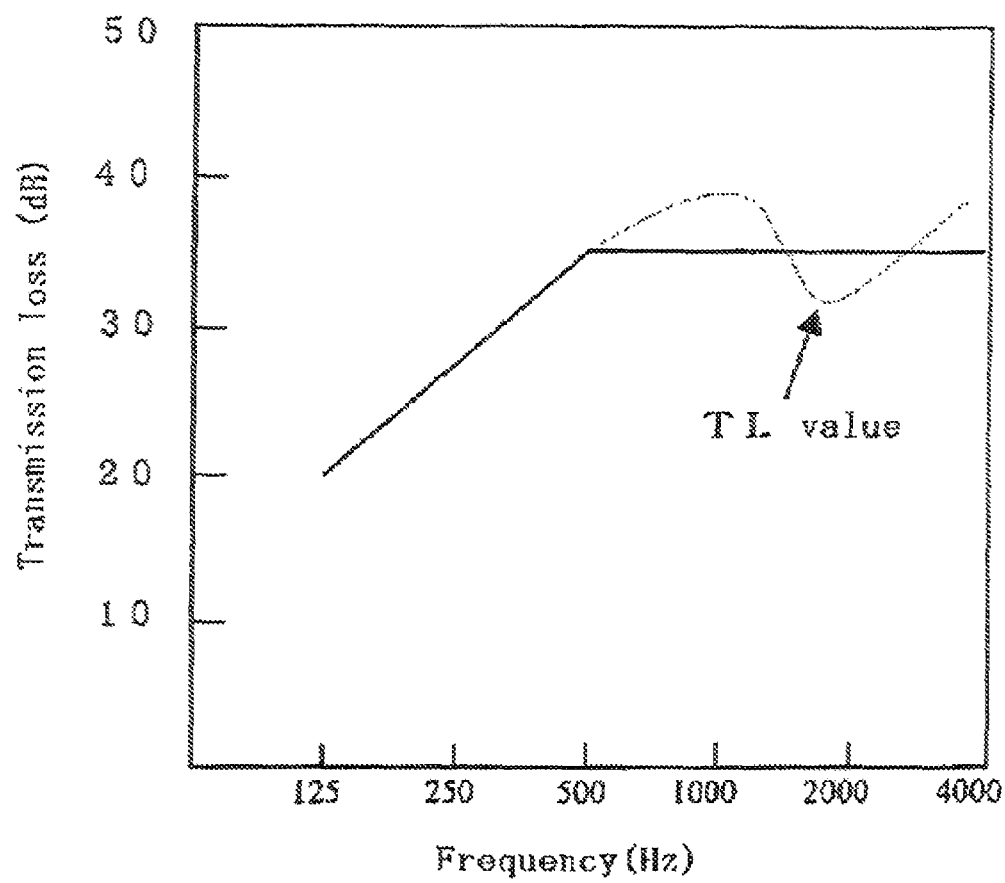
FIG. 1 is a diagrammatic view showing the sound insulation performance of a laminated glass in terms of transmission loss plotted against frequency.

The interlayer film for a laminated glass according to the first aspect of the invention is an interlayer film for a laminated glass comprising a poly(vinyl acetal) resin (C), which is a blend of a poly(vinyl acetal) resin (A) and a poly(vinyl acetal) resin (B), and a plasticizer.

The poly(vinyl acetal) resins (A) and (B) for use in this first aspect of the present invention can each be obtained by, for example, the procedure comprising dissolving a poly(vinyl alcohol) (PVA) in hot water, holding the resulting aqueous solution at a predetermined temperature, adding thereto an aldehyde and a catalyst to thereby cause an acetalization reaction to proceed, then holding the reaction mixture at a predetermined high temperature, and thereafter subjecting it serially to neutralization, water washing, and drying to give a resin powder.

The PVA mentioned above is not particularly restricted but preferably is one having an average polymerization degree within the range of 500 to 5,000. If it is less than 500, the product interlayer film for a laminated glass will be too low in strength to impart sufficient penetration resistance and impact energy absorbency to a laminated glass. On the other hand, if the polymerization degree exceeds 5,000, the resin may become hardly moldable and, in addition, the product interlayer film for a laminated glass tends to be too high in strength to impart sufficient penetration resistance and impact energy absorbency to a laminated glass. The more preferred range is 1,000 to 5,000.

The aldehyde mentioned above is not particularly restricted but includes formaldehyde, acetaldehyde, propionaldehyde, n-butyraldehyde, isobutyraldehyde, valeraldehyde, n-hexylaldehyde, 2-ethylbutyraldehyde, benzaldehyde, cinnamaldehyde, and so forth. These may be used each independently or in a combination of two or more species.

The various poly(vinyl acetal) resins thus obtained may be used each alone or in a combination of two or more species but the poly(vinyl butyral) resin obtained by acetalizing n-butyraldehyde is preferred. By using a poly(vinyl butyral) resin, the transparency, weatherability, and adhesion to glass of the interlayer film for a laminated glass can be improved.

The poly(vinyl acetal) resin (A) for use in the first aspect of the present invention has an average polymerization degree within the range of 1,000 to 3,000 and the poly(vinyl acetal) resin (B) has an average polymerization degree within the range of 3,000 to 5,000, with the difference in the average polymerization degree between said poly(vinyl acetal) resin (A) and poly(vinyl acetal) resin (B) being not less than 1,500.

By using the poly(vinyl acetal) resin (A) having an average polymerization degree within the range of 1,000 to 3,000, the sound insulation performance of the product interlayer film for a laminated glass can be made satisfactory over a broad temperature range, particularly in a low temperature region, but since the film becomes soft, panel shear and foaming take place when it is assembled into a laminated glass. On the other hand, when said poly(vinyl acetal) resin (B) having an average polymerization degree within the range of 3,000 to 5,000 is used, the product interlayer film for a laminated glass is rendered so hard as to preclude said panel shear and foaming in the product laminated glass but because the high-temperature viscosity becomes too high, the moldability of the resin is adversely affected. Therefore, the difference in the average polymerization degree between said poly(vinyl acetal) resin (A) and said poly(vinyl acetal) resin (B) is specified to be not less than 1,500.

By using a poly(vinyl acetal) resin (C) obtained by blending said polyvinyl acetal) resin (A) and said poly(vinyl acetal) resin (B) in such a combination that the difference in the average polymerization degree between the resins will be at least 1,500, the product interlayer film for a laminated glass is not only allowed to exhibit an excellent sound insulation performance over a broad temperature range but also caused to have suitable physical properties so that said panel shear and foaming in the product laminated glass can be prevented. If the difference in the average polymerization degree is less than 1,500, the product interlayer film for a laminated glass will not have favorable physical properties.

The technology for blending said poly(vinyl acetal) resin (A) with said poly(vinyl acetal) resin (B) includes, for example, the method which comprises blending poly(vinyl alcohol) (PVA) species differing in the average polymerization degree in a predetermined ratio and carrying out an acetalization reaction to give a mixed poly(vinyl acetal) resin and the method which comprises blending poly(vinyl acetal) resin species obtained from PVA species differing in the average polymerization degree.

The poly(vinyl acetal) resin (C) for use in the first aspect of the present invention has an acetalization degree of 60 to 85 mol % and an acetyl group content of 8 to 30 mol %, with the combined total of said acetalization degree and acetyl group content being not less than 75 mol %.

The poly(vinyl acetal) resin is composed of a vinyl acetal component and a vinyl alcohol component. The amounts of these components (acetalization degree, acetyl group content) in the first aspect of the invention can be determined in accordance with JIS K 6728 "Testing Methods for Polyvinyl Butyral" or by infrared absorption (IR) spectrometry.

If the above acetalization degree is less than 60 mol %, the compatibility of the resin with the plasticizer to be described hereinafter will be so poor that it will be difficult to add a necessary amount of the plasticizer to insure the sound insulation performance and penetration resistance of laminated glass. A long reaction time is required to obtain a resin having an acetalization degree of over 85 mol % and this is undesirable from the standpoint of process. The preferred acetalization degree is 63 to 70 mol %.

If said acetyl group content is less than 8 mol %, the compatibility of the resin with the plasticizer to be described hereinafter will be poor and, moreover, the glass transition temperature of the product resin will not be sufficiently lowered so that the sound insulation performance on the low temperature side may not be sufficiently improved. An attempt to obtain a poly(vinyl acetal) resinwith an acetyl group content exceeding 30 mol % cannot be recommended, for the above-mentioned reactivity of PVA with an aldehyde will be considerably decreased. The preferred acetyl group content is 10 to 24 mol %.

If the combined total of said acetalization degree and acetyl group content is less than 75 mol %, the compatibility of the resin with the plasticizer to be described below will be insufficient. The preferred total amount is not less than 77 mol %.

The plasticizer mentioned above is not particularly restricted but includes organic ester plasticizers such as monobasic acid esters and polybasic acid esters; and phosphoric acid plasticizers such as organic phosphates and organic phosphites, among others.

The monobasic acid ester plasticizer referred to above is not particularly restricted but includes glycol esters which are obtained by reacting a glycol, such as triethylene glycol, tripropylene glycol, and tetraethylene glycol, with an organic acid, such as butyric acid, isobutyric acid, caproic acid, 2-ethylbutyric acid, heptanoic acid, and 2-ethylhexanoic acid.

The polybasic acid ester plasticizer referred to above is not particularly restricted but includes esters obtained by, for example, reacting a linear-chain or branched-chain alcohol of 4 to 8 carbon atoms with an organic acid, such as adipic acid, sebacic acid, and azelaic acid.

The phosphoric acid plasticizer referred to above is not particularly restricted but includes tributoxyethyl phosphate, isodecylphenyl phosphate, and so forth.

The preferred, among the above various kinds of plasticizers, are triethylene glycol di-2-ethylbutyrate (3 GH), triethylene glycol di-2-ethylhexanoate (3GO), triethylene glycol di-n-heptanoate (3G7), triethylene glycol dicaprylate, triethylene glycol di-n-octanoate, tetraethylene glycol di-2-ethylbutyrate, tetraethylene glycol di-n-heptanoate, dihexyl adipate, dibenzyl phthalate, and so forth. The more preferred are 3 GH, 3GO, and 3G7. These plasticizers may be used independently or in a combination of two or more species.

Referring to the interlayer film for a laminated glass according to the first aspect of the invention, and to the combination of a poly(vinyl acetal) resin (C) with the plasticizer, it is preferable to use a poly(vinyl butyral) resin as the poly (vinyl acetal) resin (C) and at least one member selected from the group consisting of 3 GH, 3GO and 3G7 as the plasticizer.

The level of addition of the plasticizer relative to said poly(vinyl acetal) resin (C) is not particularly restricted but based on 100 weight parts of the poly(vinyl acetal) resin (C), the plasticizer is used preferably in a proportion of 30 to 70 weight parts. If the proportion is less than 30 weight parts, the poly(vinyl acetal) resin may not be sufficiently plasticized. If it exceeds 70 weight parts, the product interlayer film for a laminated glass will be decreased in mechanical strength with the consequent poor impact resistance and the adhesion of the interlayer to glass also tends to become insufficient.

Referring to the interlayer film for a laminated glass according to the first aspect of the invention, the cloud point of a solution prepared by dissolving 8 weight parts of said poly(vinyl acetal) resin (C) in 100 weight parts of the plasticizer is not over 50° C. If it is higher than 50° C., the compatibility of the resin with the plasticizer will be so poor that it will be difficult to add a necessary amount of the plasticizer to insure the sound insulation performance and penetration resistance of the laminated glass. The preferred cloud point is not over 30° C.

In the context of the first aspect of the present invention, the cloud point is the cloud point measured in accordance with JIS K 2269 "Testing Methods for Pour Point and Cloud Point of Crude Oil and Petroleum Products". More particularly, a solution prepared by dissolving 8 weight parts of poly(vinyl acetal) resin in 100 weight parts of plasticizer is heated to 150° C. or a higher temperature and, then, allowed to stand in an atmosphere at 10 to 30° C. to let it cool. The temperature at which local clouding begins to occur in the solution is defined as the cloud point. It is postulated that the lower the cloud point is, the higher is the compatibility of the resin with the plasticizer.

The method of measuring the temperature (cloud point) at which local clouding begins to occur in the above solution includes, for example, the method involving a visual observation of the appearance of the solution, the method which comprises measuring the haze value of the solution with a haze meter, and the method which comprises preparing a series of clouding limit samples in advance and assessing the actual cloudiness against these limit samples.

The interlayer film for a laminated glass according to the second aspect of the present invention is a laminate of films each comprising a poly(vinyl acetal) resin and at least one kind of plasticizer selected from the group consisting of triethylene glycol di-2-ethylhexanoate, tetraethylene glycol di-2-ethylhexanoate, triethylene glycol di-n-heptanoate, tetraethylene glycol di-n-heptanoate.

In this second aspect of the invention, it is preferable to laminate more than one resin films which insure a satisfactory sound insulation performance over a broad temperature range. By such lamination, the temperature dependence of sound insulation performance of each film is superimposed to render the sound insulation performance of the laminate satisfactory over a broad temperature range.

For example, to provide a laminated film with a good sound insulation performance on the lower temperature side, the sound insulation performance of one constituent layer may be shifted toward the lower end of the temperature scale. Specifically, the relative amount of the plasticizer may be increased to lower the glass transition temperature of the layer. By so doing, the sound insulation performance of the laminated film on the lower temperature side is certainly improved. However, the film will then become soft to impair the dynamic characteristics required of an interlayer film, the ease of handling and moldability, with a drastic reduction in impact resistance of the laminated glass. Moreover, when the laminated glass is held stationary in a vertical position with one of its component glass panels being allowed to move freely in the vertical direction, this glass panel tends to be displaced vertically by shear owing to the soft layer of the laminated film. This phenomenon tends to be remarkable particularly under high temperature conditions. Furthermore, in the bake test which comprises allowing a laminated glass to sit at a temperature of 100° C. or higher for about 2 hours, foaming tends to take place within the film.

Therefore, concerning the second aspect of the invention, many investigations were made to insure that the temperature dependence of sound insulation performance designed for each single layer would not be changed owing to lamination and that panel shear would not occur at high temperature.

Further, the recent trend toward the use of glass tailored to an automobile includes the use of laminated glass for the side glass and the popularity of the exposed-edge design of the front glass. In these cases, the sectional edge of the laminated glass is directly exposed to the human eye.

A laminated glass undergoes hygroscopic degradation involving whitening of the film (hygroscopic whitening) upon prolonged exposure to high humidity conditions. Thus, if this hygroscopic whitening takes place in the above cases where the sectional edge is exposed, a major aesthetic problem arises. Therefore, an improvement in moisture resistance for suppressing this hygroscopic whitening is also an indispensable requisite of a sound-insulation film.

Taking these matters into consideration, the present inventors did much research and found that the above disadvantages can be resolved and overcome by controlling the constitution of the resin of the resin film and the compatibility of the plasticizer with the resin.

The poly(vinyl acetal) resin for use in the second aspect of the invention is not particularly restricted but may be the same as the resin used in the first aspect of the invention. However, a poly(vinyl butyral) resin as acetalized with butyraldehyde is preferred in terms of film transparency, weatherability, and adhesion to glass and so forth.

The plasticizer for use in the second aspect of the invention is restricted, as mentioned above, to triethylene glycol di-2-ethylhexanoate (3GO), tetraethylene glycol di-2-ethylhexanoate (4GO), triethylene glycol di-n-heptanoate (3G7), and tetraethylene glycol di-n-heptanoate (4G7). In reconciling plasticization and sound insulation properties, it may happen, with any plasticizer other than the above species, that troubles relating to heat resistance and moisture resistance which are not observed in ordinary applications are encountered depending on test conditions. The above-mentioned plasticizer species may be used each independently or in a combination of two or more species.

The level of addition of said plasticizer is not particularly restricted but, based on 100 weight parts of the poly(vinyl acetal) resin, the plasticizer is used preferably in a proportion of 30 to 7.0 weight parts. If it is less than 30 weight parts, the plasticization of the poly(vinyl acetal) resin tends to be insufficient and the sound insulation performance will also become insufficient in many instances. On the other hand, if it exceeds 70 weight parts, the dynamic properties of the resin layer and of the interlayer film and the adhesion to glass tend to be insufficient.

The interlayer film for a laminated glass according to the second aspect of the invention shows a temperature dependence of loss tangent in which the lowest-temperature side maximum of loss tangent appears at 30° C. or lower when examined for dynamic viscoelasticity.

Generally when the dynamic viscoelasticity measurement of a high polymer material is carried out, two kinds of dynamic elastic modulus values, namely storage elastic modulus and loss elastic modulus values, and their ratio, namely loss tangent (tan $\delta$), are obtained. For example, when the above measurement is carried out with the temperature being varied, the loss tangent assumes a maximum value at a certain temperature. Generally speaking, the temperature corresponding to this maximum value corresponds to the glass transition temperature (Tg), that is to say the softening point, of the material.

When the Tg of a plasticized poly(vinyl acetal) resin film is in the neighborhood of room temperature, the sound insulation performance of a laminated glass comprising the resin film is remarkably good in the neighborhood of room temperature. However, when the Tg value is close to room temperature, the film is too soft for ease of handling in the manufacture of a laminated glass and, in addition, the impact resistance of the laminated glass tends to be insufficient. Therefore, in the second aspect of the invention, a flexible resin, film is laminated with a comparatively tough resin film to reconcile sound insulation performance and strength inclusive of the ease of handling. However, it has been found extremely difficult to measure the Tg of the individual constituent layers of a laminate. Although one may measure the Tg of each layer prior to lamination, it happens at times that the Tg values of respective layers so measured prove meaningless because, depending on the combination of a resin with a plasticizer, a migration of the plasticizer from one layer to another layer takes place after lamination.

However, it has been discovered that when the dynamic viscoelasticity measurement by the shear method is carried out, the tan $\delta$ behavior of each constituent layer of a laminate becomes apparent and the Tg of the particular layer can be estimated from this behavior.

The temperature corresponding to the maximum value of tan $\delta$ on the lowest temperature side of the interlayer film for a laminated glass according to the second aspect of the invention is relevant to the softest layer in the laminate and when this temperature is not over 30° C., the sound insulation performance of a laminated glass comprising this laminate film is quite excellent. If 30° C. is exceeded, the laminate film will not exhibit sufficient flexibility in the neighborhood of room temperature and, hence, a laminated glass comprising this laminate film will not exhibit a good sound insulation performance around room temperature.

The measurement of dynamic viscoelasticity by shear method can be carried out using an ordinary dynamic viscoelasticity measuring instrument, and the operating principle comprises applying a strain with microvibrations to a sample, detecting the response stress, and calculating the elastic modulus. From the two kinds of modulus values obtained, namely loss modulus and storage modulus values, the loss tangent (tan $\delta$) which is the ratio of said two kinds of modulus values is calculated. This tan $\delta$ gives a maximum value on the temperature scale. The temperature corresponding to this maximum value of tan $\delta$ is regarded as the glass transition temperature of the particular material.

The method of applying a strain with microvibrations is not particularly restricted but since, the tan $\delta$ behavior of each constituent layer of a laminate film cannot be measured by the pulling method, the shear method, for example, is used with advantage.

The frequency of the microvibratory strain is not particularly restricted but in consideration of the ease of measurement and the accuracy of measurement values, 10 Hz is used with advantage.

The interlayer film for a laminated glass according to the second aspect of the invention is preferably such that, in regard of at least one constituent layer thereof, the cloud point of the mixed solution of the plasticizer and the poly(vinyl acetal) resin is not higher than 50° C. The cloud point in this context has the same meaning as defined for the first aspect of the invention. When the cloud point is over 50° C., it means that the compatibility between the poly(vinyl acetal) resin and the plasticizer is not good enough so that the sound insulation performance of the layer, particularly the sound insulation performance in the low temperature region, can hardly be improved. The more preferred cloud point is not over 30° C., and the still more preferred cloud point is not over 20° C.

The interlayer film for a laminated glass according to the second aspect of the invention is preferably such that the amount of the plasticizer per 100 weight parts of the poly (vinyl acetal) resin is in at least one constituent layer larger than that in the other layer or layers by not less than 5 weight parts. By insuring this excess of at least 5 weight parts, a flexible layer can be formed in the laminate so that the temperature dependence of loss tangent can be established. If the difference is less than 5 weight parts, there will be no sufficient contribution to the formation of a flexible layer within the laminate so that no adequate sound insulation performance may be expected.

The interlayer film for a laminated glass according to the second aspect of the invention is preferably such that at least one layer is comprised of a poly(vinyl acetal) resin having an average polymerization degree of not less than 1500, an acetalization degree of 60 to 85 mol %, an acetyl group content of 8 to 30 mol %, with the combined total of said acetalization degree and acetyl group content being not less than 75 mol %.

The method of determining the amounts of components of said poly(vinyl acetal) resin in the second aspect of the invention is the same as that mentioned in the description of the first aspect of the invention.

If the above average polymerization degree is less than 1500, the sound insulation performance will not be sufficient and, in addition, the mechanical strength will also be insufficient so that the impact resistance of the laminated glass will be poor.

If the acetalization degree referred to above is less than 60 mol %, the compatibility of the resin with the plasticizer will be poor and the glass transition temperature of this layer will not be lowered so that no improvement may be obtained in sound insulation performance in the low temperature region. On the other hand, for reaction mechanism reasons, the acetalization degree cannot exceed 85 mol %. The more preferred range is 63 to 70 mol %.

If the acetyl group content referred to above is less than 8 mol %, the compatibility of the resin with the plasticizer will be poor so that the sound insulation performance of the layer may not be fully expressed. On the other hand, exceeding 30 mol % is undesirable because the rate of reaction with the aldehyde will then be drastically decreased. The more preferred range is 10 to 24 mol %.

As mentioned above, both the acetalization degree and acetyl group content of the poly(vinyl acetal) resin have an effect on the compatibility of the resin with the plasticizer. If the combined total of these is less than 75 mol %, the compatibility of the resin with the plasticizer will be poor and the sound insulation performance in the low temperature region may not be improved.

The interlayer film for a laminated glass according to the second aspect of the invention is preferably such that at least one constituent layer thereof is comprised of a poly(vinyl acetal) resin (C) obtained from a poly(vinyl alcohol) resin comprising a blend of poly(vinyl alcohol) resin (A) and poly(vinyl alcohol) resin (B), and a plasticizer, the difference in the average polymerization degree between said poly(vinyl alcohol) resin (A) and poly(vinyl alcohol) resin (B) being not less than 500, said poly(vinyl acetal) resin (C) having an acetalization degree of 60 to 85 mol % and an acetyl group content of 8 to 30 mol %, with the combined total of said acetalization degree and said acetyl group content being not less than 75 mol %, or comprised of a poly(vinyl acetal) resin (F) comprising a blend of a poly(vinyl acetal) resin (D) and a poly(vinyl acetal) resin (E), and a plasticizer, the difference in the average polymerization degree between said poly(vinyl acetal) resin (D) and poly(vinyl acetal) resin (E) being not less than 500, said poly(vinyl acetal) resin (F) having an acetalization degree of 60 to 85 mol % and an acetyl group content of 8 to 30 mol %, with the combined total of said acetalization degree and acetyl group content being not less than 75 mol %.

In regard of the second aspect of the invention, the average polymerization degree and saponification degree of the poly(vinyl alcohol) resin can be measured, for example, in accordance with JIS K 6726 "Testing methods for polyvinyl alcohol".

The poly(vinyl acetal) resin (C) mentioned above is obtainable from said poly(vinyl alcohol) resin comprising a blend of said poly(vinyl alcohol) resin (A) and poly(vinyl alcohol) resin (B) having different average polymerization degrees, and the poly(vinyl acetal) resin (F) also mentioned above is obtainable by blending said poly(vinyl acetal) resins (D) and (E) having different average polymerization degrees, with the difference in the average polymerization degree between the two material resins being not less than 500 in both cases.

Blending such resins with different average polymerization degrees broadens the temperature range over which a satisfactory sound insulation performance can be obtained. In addition, blending the resin having a higher average polymerization degree in a proportion of tens of percent with the resin having a lower average polymerization degree results in an improvement in mechanical strength as compared with the film formed exclusively from the resin having a lower polymerization degree. Because the resin having a higher polymerization degree forms films interspersed among the film formed from the resin having a lower polymerization degree and these films function as if they were crosslinking points, the flow point at high temperature is not too high and the mechanical strength is efficiently enhanced. Conversely, blending the resin having a lower average polymerization degree in a proportion of tens of percent with the resin having a higher average polymerization degree results in a decline in film fluidity at high temperature as compared with the film formed exclusively from the resin having a higher polymerization degree, thus making the resin easier to mold. This is because the resin having a lower polymerization degree functions as if it were a plasticizer. In this connection, the effect of blending is not obtained when the difference in the average polymerization degree is less than 500.

In the second aspect of the invention, it is preferable that the average polymerization degree of said poly(vinyl alcohol) resin (A) and that of said poly(vinyl acetal) resin (D) are 500 to 3,000 and the average polymerization degree of said poly(vinyl alcohol) resin (B) and that of said poly(vinyl acetal) resin (E) are 3,000 to 5,000.

By using a poly(vinyl alcohol) resin (A) having an average polymerization degree within the range of 500 to 3,000 or a poly(vinyl acetal) resin (D) having such an average polymerization degree, the mechanical characteristics of the resulting resin film can be made satisfactory and, moreover, the sound insulation performance of the laminated glass fabricated using the same film can be made satisfactory over a broad temperature range. If the average polymerization degree is less than 500, the mechanical strength of the resulting film will be drastically reduced and, hence, the impact resistance of the laminated glass will be unsatisfactory. On the other hand, if the average polymerization degree exceeds 3,000, the fluidity at high temperature will be so high that the moldability will be deteriorated.

When said poly(vinyl alcohol) resin (B) or poly(vinyl acetal) resin (E) having an average polymerization degree between 3,000 and 5,000 is blended with the above-mentioned resin (A) or (D), the mechanical strength is not sacrificed even if the glass transition temperature of the film is lowered for securing a good sound insulation performance on the low temperature side. If the average polymerization degree is less than 3,000, there will be no effect of blending at all. On the other hand, exceeding 5,000 is undesirable, for the very production of the resin will be rendered difficult.

In blending, the poly(vinyl alcohol) resin (B) or poly(vinyl acetal) resin (E) is preferably added in a proportion of 5 to 30 weight % to the poly(vinyl alcohol) resin (A) or poly(vinyl acetal) resin (D). If the proportion is less than 5 weight %, the effect of blending will not be remarkable. If it exceeds 30 weight %, the effect of blending will not increase any further.

Furthermore, it is also preferable to additionally provide a layer with greater emphasis on the dynamic properties and other handling characteristics of an interlayer film than on sound insulation properties. The poly(vinyl acetal) resin to constitute this layer is not particularly restricted but its acetalization degree is preferably not less than 50 mol %. If it is less than 50 mol %, the compatibility of the resin with the plasticizer will not be satisfactory enough so that it will be difficult to add a necessary amount of the plasticizer for securing the penetration resistance of the laminated glass.

The interlayer film for a laminated glass according to the second aspect of the invention is preferably such that at least one constituent layer thereof is made of a poly(vinyl acetal) resin containing a metal oxide microparticle having a heat ray-shielding function. By the formulation of said particle, the interlayer film for a laminated glass can be provided with heat insulation properties.

The metal oxide microparticle mentioned above is not particularly restricted but include, among others, a particle of tin-doped indium oxide (ITO), antimony-doped tin oxide (ATO), and aluminum-doped zinc oxide (AZO). The level of addition of such metal oxide microparticle is preferably 0.13 to 3.0 weight parts based on 100 weight parts of the poly(vinyl acetal) resin. If it is less than 0.13 weight parts, the infrared ray cut-off effect tends to be insufficient. If it exceeds 3.0 weight parts, the visible light transmittance tends to be decreased.

Moreover, the interlayer film for a laminated glass according to each of the first and the second aspects of the invention is preferably laminated with a polyester film. Thus, it is possible to provide a laminated glass of high strength and good sound insulation because the interlayer is strengthened by the additional lamination of a polyester film. Moreover, by the lamination of a polyester film carrying a vapor-deposited metal film having a heat ray-reflecting function, there can be provided a laminated glass having both a heat ray-reflecting function and sound insulation properties.

The laminar structure of the interlayer film for a laminated glass according to each of the first and the second aspects of the invention which is further laminated with a polyester film may for example be poly(vinyl acetal) resin film/polyester film/poly(vinyl acetal) resin film, poly(vinyl acetal) resin film/polyester film/poly(vinyl acetal) resin film, or the like.

Where necessary, the interlayer film for a laminated glass according to each of the first and the second aspects of the invention may contain one or more kinds of additives which are generally formulated, such as an ultraviolet absorber, a light stabilizer, an antioxidant, a bond strength modulating agent, a surfactant, and a colorant.

The ultraviolet absorber mentioned above is not particularly restricted but includes benzotriazole UV absorbers such as Tinuvin P, Tinuvin 320, Tinuvin 326, and Tinuvin 328, all of which are the trade names of UV absorbers manufactured by Ciba-Geigy. These may be used each independently or in a combination of two or more species.

The light stabilizer mentioned above is not particularly restricted but includes hindered amine stabilizers, such as "Adeka Stab LA-57", the trade name of a stabilizer manufactured by Asahi Denka. These may be used each independently or in a combination of two or more species.

The antioxidant mentioned above is not particularly restricted but includes phenol antioxidants such as Sumilizer BHT, the trade name of an antioxidant manufactured by Sumitomo Chemical, and Irganox 1010, the trade name of an antioxidant manufactured by Ciba-Geigy, among others. These may be used each independently or in a combination of two or more species.

A typical lamination protocol for the production of the interlayer film for a laminated glass according to each of the first and the second aspects of the invention is described below.

For example, the following kinds of resin film (X) and resin film (Y) are prepared.

Resin film (X)—which comprises 100 weight parts of poly(vinyl acetal) resin (X1) and 40 weight parts of plasticizer (X2).

Resin film (Y)—which comprises 100 weight parts of poly(vinyl acetal) resin (Y1) and 50 weight parts of plasticizer (Y2).

The two-layer structure of resin film (X)/resin film (Y) and the 3-layer structure of resin film (X)/resin film (Y)/resin film (X) can be used. The 4-layer structure consisting of resin film (X)/resin film (Y)/resin film (X)/resin film (X) may also be used.

The method of laminating these films is not restricted. The polyvinyl acetal) resin (X1) and polyvinyl acetal) resin (Y1), which constitute said resin film (X) and resin film (Y), respectively, may be the same or different species. By the same token, the plasticizer (X2) and plasticizer (Y2) may also be the same or different.

Referring to the laminar structure of resin film (X) and resin film (Y), a polyester film may be laminated on one side of the resin film (X)/resin film (Y). The typical structure includes resin film (X)/resin film (Y)/polyester film/resin film (X) and resin film (X)/resin film (Y)/resin film (X)/polyester film/resin film (X), among other combinations.

The film-forming method for the interlayer film for a laminated glass according to each of the first and the second aspects of the invention is not particularly restricted but includes the method comprising molding the constituent layers each independently and interposing them between glass panels and the method comprising molding the constituent layers as a unit by means of a multi-layer molding machine.

The whole thickness of the interlayer film for a laminated glass according to each of the first and the second aspects of the invention is preferably 0.3 to 1.6 mm, which is the thickness of the conventional interlayer film for a laminated glass. As far as an interlayer film for a laminated glass is concerned, the greater its thickness is, the higher is its sound insulation performance, but the proper thickness is preferably selected taking the penetration resistance required of the laminated glass into consideration. For all practical purposes, the above thickness range is recommended.

The interlayer film for a laminated glass according to each of the first and the second aspects of the invention can be typically manufactured by the method which comprises kneading said poly(vinyl acetal) resin and plasticizer together and molding the resulting compound into a sheet by means of a press, a calender roll, an extruder, etc.

The laminated glass can then be manufactured by interposing the interlayer film for a laminated glass according to each of the first and the second aspects of the invention between at least a pair of glass panels and bonding them into an integral unit. The laminated glass assembled by using the interlayer film for a laminated glass according to each of the first and the second aspects of the invention is also an embodiment of the present invention.

The glass panel referred to above is not particularly restricted but includes panels made of various kinds of inorganic glass or organic glass, such as float glass, polished plate, glass, figured glass, wired glass, stripe glass, heat-ray absorbing glass, and colored plate glass. These may be used each independently or in a combination of two or more species.

The interlayer film for a laminated glass according to the present invention may be sandwiched between highly rigid transparent members other than glass panels. Such transparent members may for example be those made of a polycarbonate resin. Such compositions also fall within the scope of the invention.

The method of producing the laminated glass of the invention is not particularly restricted but any known method can be employed. A typical method comprises interposing the interlayer film for a laminated glass according to the invention between glass panels and bonding them into an integral unit by means of a hot press.

Because of the above constitution, the interlayer film for a laminated glass and the laminated glass, both according to the invention, are provided with a good sound insulation performance over a broad temperature range without being compromised in the fundamental characteristics required of any laminated glass or in the moldability and ease of handling of the interlayer film for a laminated glass and, in addition, without being compromised in mechanical strength despite an improvement in the sound insulation performance on the low temperature side.

Uses for the interlayer film for a laminated glass and the laminated glass according to the second aspect of the invention, are not particularly restricted but especially for the purpose of imparting a sound insulation performance, they can be used with advantage in the field of road vehicles (particularly the front, side and rear parts of an automobile) and in the field of architecture.

BEST MODE FOR CARRYING OUT THE INVENTION

The following examples illustrate the present invention in further detail without defining the scope of the invention.

Example 1

In the first place, a PVA having an average polymerization degree of 2,000 was blended with 50 weight % of a PVA having an average polymerization degree of 3,500. Using this PVA blend, a poly(vinyl butyral) resin with a butyralization degree of 63.6 mol % and an acetyl group content of 14.3 mol % was synthesized. To 100 weight parts of this poly(vinyl butyral) resin was added 60 weight parts of the plasticizer triethylene glycol di-2-ethylhexanoate (3GO), and the mixture was thoroughly melt-kneaded with a mixing roll and pressed using a molding press at 150° C. for 30 minutes to give a 0.7 mm-thick resin film. Using this resin film as an interlayer film for a laminated glass, a laminated glass was fabricated by the following procedure.

The above interlayer film for a laminated glass was sandwiched between two square float glass panels of 300 mm square and 3 mm thick. This unpressed composition was placed in a rubber bag, and after the bag was evacuated at a vacuum level of 2.7 kPa for 20 minutes, with the vacuum level being maintained, the bag was transferred to an oven preheated at 90° C. and held at this temperature for 30 minutes. This provisionally vacuum-pressed composition was then heat-bonded in an autoclave at a pressure of 1.2 MPa and a temperature of 135° C. to provide a transparent laminated glass.

Example 2

In the first place, a PVA having an average polymerization degree of 2,000 was blended with 30 weight % of a PVA having an average polymerization degree of 3,500. From this PVA blend, a poly(vinyl butyral) resin having a butyralization degree of 63.3 mol % and an acetyl group content of 14.3 mol % was synthesized. Using this resin, an interlayer film for a laminated glass and a laminated glass were fabricated in the same manner as in Example 1.

Example 3

In the first place, a PVA having an average polymerization degree of 2,400 was blended with 30 weight % of a PVA having an average polymerization degree of 4,200. From this PVA blend, a poly(vinyl butyral) resin having a butyralization degree of 63.3 mol % and an acetyl group content of 14.4 mol % was synthesized. Using this resin, an interlayer film for a laminated glass and a laminated glass were fabricated in the same manner as in Example 1.

Comparative Example 1

Starting with a PVA with an average polymerization degree of 2,000, a poly(vinyl butyral) resin with a butyralization degree of 63.7 mol % and an acetyl group content of 14.3 mol % was synthesized. Using this resin, an interlayer film for a laminated glass and a laminated glass were fabricated in the same manner as in Example 1.

Comparative Example 2

Starting with a PVA with an average polymerization degree of 3,500, a poly(vinyl butyral) resin with a butyralization degree of 63.9 mol % and an acetyl group content of 14.4 mol % was synthesized. Using this resin, an interlayer film for a laminated glass and a laminated glass were fabricated in the same manner as in Example 1.

Comparative Example 3

In the first place, a PVA with an average polymerization degree of 2,000 was blended with 30 weight % of a PVA with an average polymerization degree of 2,800. Starting with this PVA blend, a poly(vinyl butyral) resin with a butyralization degree of 64.1 mol % and an acetyl group content of 14.4 mol % was synthesized. Using this resin, an interlayer film for a laminated glass and a laminated glass were fabricated in the same manner as in Example 1.

Comparative Example 4

In the first place, a PVA with an average polymerization degree of 2,800 was blended with 30 weight % of a PVA with an average polymerization degree of 3,500. Starting with this PVA blend, a poly(vinyl butyral) resin with a butyralization degree of 64.4 mol % and an acetyl group content of 14.3 mol % was synthesized. Using this resin, an interlayer film for a laminated glass and a laminated glass were fabricated in the same manner as in Example 1.

Comparative Example 5

In the first place, a PVA with an average polymerization degree of 2,000 was blended with 50 weight % of a PVA with an average polymerization degree of 3,500. Starting with this PVA blend, a poly(vinyl butyral) resin with a butyralization degree of 68.5 mol % and an acetyl group content of 0.9 mol % was synthesized. Using this resin, an interlayer film for a laminated glass and a laminated glass were fabricated in the same manner as in Example 1.

Comparative Example 6

In the first place, a PVA with an average polymerization degree of 500 was blended with 50 weight % of a PVA with an average polymerization degree of 2,000. Starting with this PVA blend, a poly(vinyl butyral) resin with a butyralization degree of 63.5 mol % and an acetyl group content of 14.4 mol % was synthesized. Using this resin, an interlayer film for a laminated glass and a laminated glass were fabricated as in Example 1.

(3) Moldability, Etc.

The moldability of the synthesized resin into an interlayer film for a laminated glass and the incidence of panel shear and foaming during the fabrication of a laminated glass using the interlayer film were evaluated.

The symbols used in Table 1 have the following meanings.

O: Good moldability; little panel shear, foaming, etc. occurred during fabrication of laminated glass Δ: Slightly poor moldability; panel shear, foaming, etc. observed during fabrication of laminated glass X: Poor moldability; panel shear, foaming, etc. observed during fabrication of laminated glass

TABLE 1

|  |  | Poly(vinyl acetal) resin | | | Sound insulation performance TL value (dB) | | | | | |
|---|---|---|---|---|---|---|---|---|---|---|
|  |  | Polymerization degree of PVA (blending ratio) | Butyralization degree mol % | Acetyl group content mol % | 0° C. | 10° C. | 20° C. | 30° C. | Flow viscosity poise | Moldability, etc. |
| Example | 1 | 2500 (50 wt. %) 3500 (50 wt. %) | 63.6 | 14.3 | 36 | 37 | 35 | 33 | $1.85 \times 10^5$ | O |
|  | 2 | 2000 (70 wt. %) 3500 (30 wt. %) | 63.3 | 14.3 | 37 | 37 | 35 | 33 | $1.03 \times 10^5$ | O |
|  | 3 | 2400 (70 wt. %) 4200 (30 wt. %) | 63.3 | 14.4 | 36 | 36 | 34 | 33 | $1.99 \times 10^6$ | O |
| Comparative example | 1 | 2000 (100 wt. %) | 63.7 | 14.3 | 36 | 37 | 35 | 34 | $3.75 \times 10^4$ | X |
|  | 2 | 3500 (100 wt. %) | 63.9 | 14.4 | 36 | 36 | 34 | 33 | $1.35 \times 10^6$ | X |
|  | 3 | 2000 (70 wt. %) 2800 (30 wt. %) | 64.1 | 14.4 | 37 | 36 | 35 | 33 | $5.33 \times 10^4$ | X |
|  | 4 | 2800 (70 wt. %) 3500 (30 wt. %) | 64.4 | 14.3 | 36 | 36 | 34 | 33 | $6.26 \times 10^5$ | Δ |
|  | 5 | 2000 (50 wt. %) 3500 (50 wt. %) | 68.5 | 0.9 | 22 | 23 | 28 | 32 | $1.97 \times 10^6$ | O |
|  | 6 | 500 (50 wt. %) 2000 (50 wt. %) | 63.5 | 14.4 | 36 | 35 | 34 | 33 | $5.46 \times 10^3$ | X |

The interlayer films and laminated glasses produced in Examples 1 to 3 and Comparative Examples 1 to 6 were evaluated for film physical properties and sound insulation performance by the following methods. The results are presented in Table 1.

(1) Physical Properties of the Interlayer Film for a Laminated Glass

The 110° C. flow viscosity of the interlayer film for a laminated glass was measured with a flow tester (manufactured by Shimadzu, Flow Tester CFT500) and evaluated.

In Table 1, the interlayer with a large flow viscosity and satisfactory physical properties is rated O and the interlayer with a small flow viscosity and unsatisfactory physical properties is rated X.

(2) Sound Insulation Performance of the Laminated Glass

Using a vibration generator (manufactured by Shinkensha, vibrator model G21-005D) for damping test use, the laminated glass was vibrated at a predetermined temperature, the generated vibration characteristics were amplified with a mechanical impedance amplifier (manufactured by Lyon; XG-81) and the vibration spectrum was analyzed with an FFT analyzer (manufactured by Yokogawa-Hewlett-Packard, FFT Spectrum Analyzer HP-3582AA). From the thus-obtained ratio of loss factor/resonance frequency with glass; the loss factor was calculated. Based on the result, the minimum transmission loss around the frequency of 2,000 Hz was taken as the TL value. Measurements were made between 0 and +30° C. at 10° C. intervals.

It is apparent from Table 1 that the interlayer films for laminated glasses obtained in Examples 1 to 3 are satisfactory in physical properties and, showing only minor reductions in the TL value, exhibit good sound insulation performance over a broad temperature range. On the other hand, the interlayer films for laminated glasses obtained in Comparative Examples 1 to 6 were not as satisfactory in both of sound insulation performance and physical properties.

Example 4

Preparation of Layer (A)

To a poly(vinyl butyral) resin (butyralization degree=68.9 mol %, acetylation degree=0.9 mol %; PVB) was added 39 weight parts (relative to 100 weight parts of the resin) of triethylene glycol di-2-ethylhexanoate (3GO) as plasticizer.

The mixture was thoroughly kneaded on a mixing roll and a predetermined amount of the kneaded mass was transferred to a molding press and held at 150° C. for 30 minutes, whereby a 0.2 mm thick layer (A) was obtained.

Preparation of Layer (B)

In the first place, a poly(vinyl alcohol) (PVA) with an average polymerization degree of 1,700 was used to synthesize a PVB resin with a butyralization degree of 64.5 mol % and an acetylation degree of 14.3 mol %. To 100 weight parts of the PVB resin so synthesized was added 60 weight parts of the plasticizer 3GO and the mixture was thoroughly kneaded on a mixing roll. The kneaded mass was transferred to a molding press and held at 150° C. for 30 minutes, whereby a 0.4 mm-thick layer (B) was obtained. The cloud point of the above resin and plasticizer was measured.

(Preparation of a Laminated Film, and Fabrication of a Laminated Glass Using the Film)

The layers (A) and (B) obtained as above were laminated together in the layer (A)/layer (B)/layer (A) arrangement to prepare a three-layer interlayer. From the laminated film thus obtained, a 20 mm square sample was cut out for dynamic viscoelasticity measurement.

Then, the interlayer film was sandwiched between two float glass panels of 300 mm square and 3 mm thick and this unpressed sandwich composition was placed in a rubber bag and, after 20 minutes evacuation at a vacuum level of 2.7 kPa, the bag was transferred, as evacuated, to an oven at 90° C. and held at this temperature for 30 minutes. The sandwich composition provisionally integrated by the above vacuum pressing was hot-pressed in an autoclave under a pressure of 12 kg/cm² and a temperature of 135° C. to give a transparent laminated glass.

Example 5

In the preparation of layers (A) and (B), triethylene glycol di-n-heptanoate (3G7) was used as the plasticizer.

In the preparation of layer (B), a poly(vinyl butyral) resin derived from a PVA with an average polymerization degree of 2,000 was used and the level of addition of 3G7 was set to 58 weight parts. Otherwise, the procedure of Example 4 was followed to give a laminated glass.

Example 6

In the preparation of layers (A) and (B), tetraethylene glycol di-2-ethylhexanoate (4GO) was used as the plasticizer. In the preparation of layer (A), the level of addition of 4GO to the poly(vinyl butyral) resin was set to 40 weight parts. Otherwise, the procedure of Example 4 was followed to give a laminated glass.

Example 7

In the preparation of layers (A) and (B), tetraethylene glycol di-n-heptanoate (4G7) was used as the plasticizer. In the preparation of layer (A), the level of addition of 4G7 to the poly(vinyl butyral) resin was set to 40 weight parts. On the other hand, in the preparation of layer (B), a poly(vinyl butyral) resin derived from a PVA with an average polymerization degree of 2000 was used and the level of addition of 4G7 was set to 55 weight parts. Otherwise, the procedure of Example 4 was followed to give a laminated glass.

Example 8

The thickness of layers (A) and (B) was set to 0.4 mm each and a two-layer arrangement of layer (A)/layer (B) was employed. Otherwise, the procedure of Example 4 was followed to give a laminated glass.

Example 9

The thickness of layer (A) was set to 0.2 mm while the thickness of layer (B) was set to 0.1 mm, and a 5-layer arrangement of layer (A)/layer (B)/layer (A)/layer (B)/layer (A) was employed. Otherwise, the procedure of Example 4 was followed to give a laminated glass.

Comparative Example 7

Except that 3 GH was used as the plasticizer in the preparation of layers (A) and (B), the procedure of Example 4 was followed to give a laminated glass.

Comparative Example 8

Except that, in the preparation of layer (B), 3 GH was used as the plasticizer and the level of addition was set to 40 weight parts, the procedure of Example 4 was followed to give a laminated glass.

The interlayer films and laminated glasses produced in Examples 4 to 9 and Comparative Examples 7 and 8 were respectively tested for performance characteristics and evaluated by the following methods. The results are presented in Table 2.

(Sound Insulation Performance Test)

From each laminated glass, a rectangular sample measuring 20 mm wide and 150 mm long was cut out as a test piece for sound insulation performance. The sound insulation performance was measured in the same manner as in Example 1.

(Dynamic Viscoelasticity Measurement)

The solid viscoelasticity tester RSA-II manufactured by Rheometrics was used as the instrument. A 10×16 cm rectangular sample was cut out from each laminate and a sinusoidal strain with a measuring frequency of 1.0 Hz was applied at a strain rate of 0.1% in the shear direction.

The measuring temperature range was −20° C. to +100° C., and the measurement was made at a temperature increasing rate of 3° C./min.

Under the above conditions, storage modulus (G'), loss modulus (G"), and their ratio, namely loss tangent (tan δ) were measured as dynamic viscoelastic characteristics. Then, from the temperature curve of tan δ, the temperature corresponding to the maximum value of tan δ was determined and used as the glass transition temperature.

(Heat Resistance Test)

The product laminated glass was left standing in a thermostatic chamber at 90° C. for 4 weeks and then examined for edge delamination (between glass and film). The evaluation was made in terms of the amount of delamination from the edge. The smaller the amount of delamination is, the higher is the heat resistance.

(Moisture Resistance Test)

The laminated glass was left standing in a thermohygrostat chamber at 50° C., 95% RH for 4 weeks. At the end of this 4-week period, the laminated glass was taken out and the distance of whitening from the edge was determined. The shorter the distance of whitening is, the higher is the moisture resistance of the laminated glass.

TABLE 2

| | Layer (A) | | | Layer (B) | | | | | | tan δ |
|---|---|---|---|---|---|---|---|---|---|---|
| | Resin | | | Resin | | | | Plasticizer | | Maximum on |
| | Bu | Plasticizer | | Bu | Ac | | | | | lowest |
| | degree (mol %) | Species | Weight parts | degree (mol %) | degree (mol %) | Polymerization degree | Species | Weight parts | Cloud point | temperature side |
| Example 4 | 68.9 | 3GO | 39 | 64.5 | 14.3 | 1700 | 3GO | 60 | <20° C. | 5° C. |
| Example 5 | 68.9 | 3G7 | 39 | 64.5 | 14.3 | 2000 | 3G7 | 58 | 30° C. | 9° C. |
| Example 6 | 68.9 | 4GO | 40 | 64.5 | 14.3 | 1700 | 4GO | 60 | <20° C. | 6° C. |
| Example 7 | 68.9 | 4G7 | 40 | 577.5 | 14.3 | 2000 | 4G7 | 55 | <20° C. | 10° C. |
| Example 8 | 68.9 | 3GO | 39 | 64.5 | 14.3 | 1700 | 3GO | 60 | <20° C. | 5° C. |
| Example 9 | 68.9 | 3GO | 39 | 64.5 | 14.3 | 1700 | 3GO | 60 | <20° C. | 5° C. |
| Comparative example 7 | 68.9 | 3GH | 39 | 64.5 | 14.3 | 1700 | 3GH | 60 | 40° C. | 8° C. |
| Comparative example 8 | 68.9 | 3GO | 39 | 64.5 | 14.3 | 1700 | 3GH | 40 | <20° C. | 37° C. |

| | | Evaluation of laminated glass | | | | | |
|---|---|---|---|---|---|---|---|
| | Laminar structure | Heat resistance Delamination | Moisture resistance Whitening | Sound insulation performance TL value (dB) | | | |
| | Arrangement | (mm) | (mm) | 0° C. | 10° C. | 20° C. | 30° C. |
| Example 4 | A/B/A | 0.0 | 0.5 | 33 | 36 | 35 | 33 |
| Example 5 | A/B/A | 0.0 | 0.5 | 32 | 35 | 36 | 33 |
| Example 6 | A/B/A | 0.0 | 0.5 | 32 | 36 | 35 | 32 |
| Example 7 | A/B/A | 0.0 | 0.5 | 33 | 35 | 35 | 33 |
| Example 8 | A/B | 0.0 | 0.5 | 34 | 36 | 35 | 33 |
| Example 9 | A/B/B/A | 0.0 | 0.5 | 33 | 35 | 36 | 32 |
| Comparative example 7 | A/B/A | 5.0 | 1.0 | 30 | 31 | 32 | 31 |
| Comparative example 8 | A/B/A | 0.0 | 0.5 | 15 | 19 | 25 | 31 |

Example 10

Preparation of Layer (A)

To 100 weight parts of a polyvinyl butyral) resin (butyralization degree=68.9 mol %, acetylation degree=0.9 mol %; PVB) was added 39 weight parts of the plasticizer triethylene glycol di-2-ethylhexanoate (3GO).

The mixture was thoroughly kneaded on a mixing roll and a predetermined amount of the kneaded mass was transferred to a molding press and held at 150° C. for 30 minutes, whereby a 0.2 mm-thick layer (A) was obtained.

Preparation of Layer (B)

In the first place, 100 weight parts of a poly(vinyl alcohol) (PVA) with an average polymerization degree of 2,000 was blended with 25 weight parts of a PVA with an average polymerization degree of 3,500. This PVA blend was used to synthesize a PVB resin with a butyralization degree of 64.5 mol % and an acetylation degree of 14.3 mol %. To 100 weight parts of the PVB resin thus obtained was added 60 weight parts of the plasticizer 3GO. This mixture was thoroughly kneaded on a mixing roll and a predetermined amount of the kneaded mass was transferred to a molding press and held at 150° C. for 30 minutes, whereby a 0.4 mm-thick layer (B) was obtained. The cloud point of the resin and plasticizer was measured.

(Preparation of a Laminated Film and a Laminated Glass Incorporating the Film)

The layers (A) and (B) prepared as above were superposed in the layer (A)/layer (B)/layer (A) arrangement to give a three-layer interlayer film.

This interlayer was sandwiched between a pair of float glass panels each measuring 300 mm square and 3 mm thick and this unpressed sandwich composition was placed in a rubber bag. The bag was evacuated at a vacuum level of 2.7 kPa for 20 minutes and transferred in evacuated state to an oven at 90° C. and held at that temperature for 30 minutes. The sandwich composition provisionally integrated by the above vacuum pressing was heat-bonded in an autoclave under a pressure of 12 kg/cm² at a temperature of 135° C. to give a transparent laminated glass.

Example 11

Except that, in the preparation of layers (A) and (B), triethylene glycol di-n-heptanoate (3G7) was used as the plasticizer and that the level of addition thereof in the preparation of layer (B) was set to 58 weight parts, the procedure of Example 10 was followed to give a laminated glass.

Example 12

One-hundred weight parts of a PVA with an average polymerization degree of 2,000 was blended with 11 weight parts of a PVA with an average polymerization degree of 500. This PVA blend was used to synthesize a PVB resin with a butyralization degree of 64.5 mol % and an acetylation degree of 14.3 mol %. Except that this PVB resin was used in the preparation of layer (B), the procedure of Example 10 was followed to give a laminated glass.

Example 13

One-hundred weight parts of a PVA with an average polymerization degree of 1,700 was blended with 42 weight parts of a PVA with an average polymerization degree of 3,500. This PVA blend was used to synthesize a PVB resin with a butyralization degree of 64.5 mol % and an acetylation degree of 14.3 mol %. Except that this PVB resin was used in the preparation of layer (B), the procedure of Example 10 was followed to give a laminated glass.

Example 14

The layer (A) was prepared by adding 40 weight parts of tetraethylene glycol di-2-ethylhexanoate (4GO) as the plasticizer to 100 weight parts of a PVB resin (butyralization degree=65.9 mol %, acetylation degree=0.9 mol %).

The layer (B) was prepared by adding 60 weight parts of 4GO as the plasticizer to a PVB resin (butyralization degree=57.3 mol acetylation degree=20.0° mol %) obtained from the blend of 100 weight parts of a PVA with an average polymerization degree of 2,300 and 42 weight parts of a PVA with an average polymerization degree of 4,000. Otherwise, the procedure of Example 10 was followed to give a laminated glass.

Example 15

The layer (A) was prepared by adding 40 weight parts of tetraethylene glycol di-n-heptanoate (4G7) as the plasticizer to 100 weight parts of a PVB resin (butyralization degree=68.9 mol %, acetylation degree=0.9 mol %).

For use as the layer (B), the following resin film was prepared. Thus, 100 weight parts of a PVB resin (butyralization degree=64.5 mol %, acetylation degree=14.3 mol %) synthesized from a PVA having an average polymerization degree of 1,700 was blended with 42 weight parts of a PVB resin (butyralization degree=64.5 mol %, acetylation degree=14.3 mol %) synthesized from a PVA having an average polymerization degree of 4,000. To 100 weight parts of this PVB resin blend was added 60 weight parts of 4G7 as the plasticizer, and a resin film was prepared.

Otherwise, the procedure of Example 10 was repeated to fabricate a laminated glass.

Example 16

For use as the layer (B), the following resin film was prepared. One-hundred weight parts of a PVB resin (butyralization degree=64.5 mol %, acetylation degree=14.3 mol %) synthesized from a PVA with an average polymerization degree of 1,200 was blended with 100 weight parts of a PVB resin (butyralization degree=64.5 mol %, acetylation degree=14.3 mol %) synthesized from a PVA with an average polymerization degree of 3,500. To 100 weight parts of this PVB resin blend was added 60 weight parts of 3GO as the plasticizer, and a resin film was prepared.

Otherwise, the procedure of Example 10 was followed to give a laminated glass.

Comparative Example 9

Except that 3 GH was selected as the plasticizer to be added to both layers (A) and (B) and that a PVB resin having a butyralization degree of 64.5 mol % and an acetylation degree of 14.3 mol % as synthesized from a PVA with an average polymerization degree of 1,700 was used for the preparation of layer (B), the procedure of Example 10 was followed to give a laminated glass.

Comparative Example 10

Except that 3 GH was selected as the plasticizer to be added to both layers (A) and (B) and that a PVB resin having a butyralization degree of 64.5 mol % and an acetylation degree of 14.3 mol % as synthesized from a PVA with an average polymerization degree of 3,500 was used for the preparation of layer (B), the procedure of Example 10 was followed to give a laminated glass.

Comparative Example 11

Except that DHA was selected as the plasticizer to be added to both layers (A) and (B), that the level of addition of the plasticizer to layer (A) was set to 40 weight parts, and that a PVB resin with a butyralization degree of 57.3 mol % and an acetylation degree of 13.0 mol % was used as the PVB resin for layer (B), the procedure of Example 10 was followed to give a laminated glass.

Comparative Example 12

Except that 3 GH was selected as the plasticizer to be added to both layers (A) and (B) and that a PVA obtained by blending 100 weight parts of a PVA having an average polymerization degree of 1,700 with 42 weight parts of a PVA having an average polymerization degree of 1,900 was used for layer (B), the procedure of Example 10 was followed to give a laminated glass.

Comparative Example 13

Except that as the layer (B), a resin film prepared by adding 60 weight parts of the plasticizer 3 GH to 100 weight parts of the same PVB resin as used for layer (A) in Example 14 was used, the procedure of Example 14 was followed to give and evaluate a laminated glass.

The interlayer films and laminated glasses produced in Examples 10 to 16 and Comparative Examples 9 to 13 were respectively subjected to the following performance tests. The results are presented in Table 3.
(Sound Insulation Test)

From each laminated glass, a rectangular sample measuring 20 mm wide and 150 mm long was cut out for use as a sound insulation performance specimen. The sound insulation performance test was carried out in the same manner as in Example 1.
(Dynamic Viscoelasticity Measurement)

In the same manner as in Example 4, tan δ was measured and the glass transition temperature was determined.
(Panel Shear at High Temperature)

The product laminated glass was supported vertically in such a manner that while one of its glass panels was held stationary, the other panel was free to move in a vertical direction. The sheet thus supported was placed in a thermostatic chamber at 80° C. and the amount of shear of the freely movable glass panel in the vertical direction was measured after one week of sitting of the sheet in the chamber. The sheet was rated "acceptable" when the above amount of shear was within the range of 3 mm.
(Bake Test)

The laminated glass was allowed to sit in a thermostatic chamber at 130° C. for 2 hours and the foaming along the glass edge was visually evaluated. The sample was rated "acceptable" when foaming took place only within 15 mm from the peripheral edge and "not acceptable" otherwise. Among samples considered acceptable, those showing a total of not more than 10 air cells were rated "excellent".
◎: Excellent
○: Acceptable
X: Not acceptable

TABLE 3

| | Layer (A) | | | Layer (B) | | | | | | tan δ |
|---|---|---|---|---|---|---|---|---|---|---|
| | Resin | | | Resin | | | | Plasticizer | | Maximum on lowest temperature side |
| | Bu | Plasticizer | | Bu | Au | | | | | |
| | degree (mol %) | Species | Weight parts | degree (mol %) | degree (mol %) | Polymerization degree | Species | Weight parts | Cloud point | |
| Example 10 | 68.9 | 3GO | 39 | 64.5 | 14.3 | 2000 3500 | 3GO | 60 | <20° C. | 5° C. |
| Example 11 | 68.9 | 3G7 | 39 | 64.5 | 14.3 | 2000 3500 | 3G7 | 58 | 30° C. | 9° C. |
| Example 12 | 68.9 | 3GO | 39 | 64.5 | 14.3 | 2000 500 | 3GO | 60 | <20° C. | 5° C. |
| Example 13 | 68.9 | 3GO | 39 | 64.5 | 14.3 | 1700 3500 | 3GO | 60 | <20° C. | 5° C. |
| Example 14 | 65.9 | 4GO | 40 | 57.3 | 20.0 | 2300 4000 | 4GO | 60 | <20° C. | 6° C. |
| Example 15 | 68.9 | 4G7 | 40 | 64.5 | 14.3 | 1700 4000 | 4G7 | 60 | 30° C. | 10° C. |
| Example 16 | 68.9 | 3GO | 39 | 64.5 | 14.3 | 1200 3500 | 3GO | 60 | <20° C. | 5° C. |
| Comparative example 9 | 68.9 | 3GH | 39 | 64.5 | 14.3 | 1700 | 3GH | 60 | 40° C. | 8° C. |
| Comparative example 10 | 68.9 | 3GH | 39 | 64.5 | 14.3 | 3500* | 3GH | 60 | 40° C. | 8° C. |
| Comparative example 11 | 68.9 | DHA | 40 | 57.3 | 13 | 2000 3500 | DHA | 60 | 60° C. | 21° C. |
| Comparative example 12 | 68.9 | 3GH | 39 | 64.5 | 14.3 | 1700 1900 | 3GH | 60 | 40° C. | 8° C. |
| Comparative example 13 | 65.9 | 3GH | 40 | 65.9 | 0.9 | 2300 4000 | 3GH | 60 | 110° C. | 37° C. |

| | Evaluation of laminated glass | | Sound insulation performance | | | |
|---|---|---|---|---|---|---|
| | Panel shear | | TL value (dB) | | | |
| | (mm) | Bake test | 0° C. | 10° C. | 20° C. | 30° C. |
| Example 10 | 1.5 | ◉ | 33 | 36 | 35 | 33 |
| Example 11 | 1.5 | ◉ | 32 | 35 | 36 | 33 |
| Example 12 | 2 | ◉ | 32 | 36 | 35 | 32 |
| Example 13 | 1.5 | ◉ | 33 | 35 | 35 | 33 |
| Example 14 | 1 | ◉ | 32 | 35 | 34 | 33 |
| Example 15 | 1 | ◉ | 31 | 34 | 35 | 34 |
| Example 16 | 1 | ◉ | 32 | 35 | 35 | 33 |
| Comparative example 9 | 5 | ○ | 30 | 31 | 32 | 31 |
| Comparative example 10 | 0.5 | ◉ | 29 | 30 | 33 | 32 |
| Comparative example 11 | 1.5 | ◉ | 22 | 25 | 32 | 33 |
| Comparative example 12 | 5 | ○ | 30 | 30 | 31 | 32 |
| Comparative example 13 | 1 | ◉ | 18 | 22 | 25 | 31 |

*Moldability very poor

Example 17

The interlayer film described in Example 4 and a 0.4 mm-thick film prepared by press-molding the resin-plasticizer composition described for layer (A) in Example 4 were laminated with interposition of the polyethylene telephthalate (PET) film Lumirror S-10 (0.05 mm thick), a product of Toray.

Using the interlayer film thus constructed, a laminated glass was fabricated.

Comparative Example 14

The interlayer film described in Comparative Example 7 was laminated with a 0.44 mm-thick film press-molded from the resin-plasticizer composition described for layer (A) in Comparative Example 7 without interposition of PET film. Using the interlayer thus constructed, a laminated glass was fabricated.

The interlayer films and laminated glasses produced in Example 17 and Comparative Example 14 were respectively evaluated for sound insulation performance as in Example 1 and further subjected to a ball-drop test in accordance with the following protocol. The results are presented in Table 4.

The evaluation test was carried out by a protocol based on JIS R 3212 with the height of dropping a steel ball grading in units of 0.25 m and the height at which the ball penetration was prevented in 50% of the total number of laminated glass test pieces was determined. The distance between the steel ball and the glass surface was taken as "average ball dropping height". Therefore, the larger the value of said average ball dropping height is, the greater is the penetration resistance.

TABLE 4

| | | Evaluation of laminated glass Average ball dropping | Sound insulation performance, TL value(dB) | | | |
|---|---|---|---|---|---|---|
| 7 | Laminate Arrangement | height (m) | 0° C. | 10° C. | 20° C. | 30° C. |
| Example 17 | Interlayer film of Ex. 4/ PET/Layer (A) of Ex. 4 | 6.5 | 31 | 34 | 35 | 34 |
| Comparative example 14 | Interlayer film of Comp. Ex. 7/ Layer (A) of Comp. Ex. 7 | 5 | 29 | 30 | 30 | 32 |

Example 18

Except that, in preparing the layer (B), 100 weight parts of the poly(vinyl butyral) resin was mixed with 60 weight parts of the plasticizer 3GO and, as the metal oxide microparticle, ITO was further added in a proportion of 1.4 weight parts based on the whole interlayer film, a three-layer resin film was prepared in the same manner as in Example 4 and a laminated glass was fabricated using the film.

Example 19

Except that, in preparing the layer (B), ATO was added as the metal oxide particle, the procedure of Example 5 was otherwise followed to fabricate a laminated glass.

Comparative Example 15

Except that an interlayer film of the 3-layer composition described in Comparative Example 7 was used and that in fabricating a laminated glass, an ITO vapor-deposited heat ray-reflecting glass was used in lieu of the float glass, the procedure of Example 14 was followed to give a laminated glass.

The interlayer films for laminated glasses and laminated glasses produced in Examples 18 and 19 and Comparative Example 15 were respectively evaluated for sound insulation performance in the same manner as in Example 1 and a dynamic viscoelasticity determination was also carried out as in Example 4. In addition, the following performance tests were carried out. The results are presented in Table 5.

(Optical Characteristics)

Using a spectrophotometer (manufactured by Shimadzu, UV3100), the transmittance of the laminated glass was measured at 340 to 1800 nm and in accordance with JIS Z 8722, JIS R 3106, and JIS Z 8701, the visible light transmittance Tv at 380 to 780 nm and the solar radiation transmittance Ts at 340 to 1800 nm were evaluated.

(Electromagnetic Wave Transmission)

In accordance with the KEC method (electromagnetic wave shielding test), the reflection loss value (dB) over the range of 10 to 2,000 MHz was measured, with the 3 mm-thick ordinary single-layer float glass sheet being used as control, and the maximum difference in reflection loss value within the above-mentioned frequency range was evaluated as ΔdB-max.

TABLE 5

| | Layer (A) | | | Layer (B) | | | | | | | tan δ |
|---|---|---|---|---|---|---|---|---|---|---|---|
| | Resin | | | Resin | | | | Plasticizer | | Metal | Maximum on |
| | Bu | Plasticizer | | Bu | Ac | | | | | | lowest |
| | degree (mol %) | Species | Weight parts | degree (mol %) | degree (mol %) | Polymerization degree | | Species | Weight parts | oxide fine particle | temperature side |
| Example 18 | 68.9 | 3GO | 39 | 64.5 | 14.3 | 1700 | | 3GO | 60 | ITO | 5° C. |
| Example 19 | 68.9 | 3G7 | 39 | 64.5 | 14.3 | 2000 | | 3G7 | 58 | ATO | 9° C. |
| Comparative example 15 | 68.9 | 3GH | 39 | 64.5 | 14.3 | 1700 | | 3GH | 60 | Coated glass | 8° C. |

| | | | Evaluation of laminated glass | | | Evaluation of laminated glass Sound insulation performance | | | |
|---|---|---|---|---|---|---|---|---|---|
| | | | | Δ dBmax | | | | | |
| | Tv % | Ts % | Electric field | Magnetic field | | TL value (dB) | | | |
| | | | | | 0° C. | 10° C. | 20° C. | 30° C. | |
| Example 18 | 78 | 50.0 | 1 | 1 | 33 | 36 | 35 | 33 | |
| Example 19 | 77 | 49.0 | 1 | 1 | 32 | 35 | 36 | 33 | |
| Comparative example 15 | 80 | 56.0 | 50.0 | 20.0 | 30 | 31 | 32 | 31 | |

Tv: Visible light transmission
Ts: Solar radiation transmission

Industrial Applicability

The interlayer film for a laminated glass according to the present invention, by virtue of the constitution described hereinbefore, exhibits an excellent sound insulation performance over a broad temperature range with prevention of a reduction in TL value through attenuation of the coincidence effect without being compromised in the basic characteristics required of laminated glass such as transparency, weatherability, impact energy absorbency, and adhesion to glass, or in film moldability and ease of handling, and in the fabrication of a laminated glass, prevents panel shear and foaming on account of its appropriate physical properties.

The invention claimed is:

1. An interlayer film for a laminated glass
which comprises a laminate of films each comprising a poly (vinyl acetal) resin and at least one plasticizer selected from the group consisting of triethylene glycol di-2-ethylhexanoate, tetraethylene glycol di-2-ethylhexanoate, triethylene glycol di-n-heptanoate, and tetraethylene glycol di-n-heptanoate, and
which shows a temperature dependence of loss tangent
in which the lowest-temperature side maximum of loss tangent appears at 30° C. or lower when examined for dynamic viscoelasticity,
wherein the amount of the plasticizer relative to 100 weight parts of the poly (vinyl acetal) resin is larger in at least on constituent layer than that in the other layer or layers by not less than 5 weight parts, and
wherein at least on constituent layer is such that the poly (vinyl acetal) resin contains a metal oxide microparticle heaving heat ray-shielding function,
wherein the level of addition of the metal oxide microparticle is 0.13 to 3.0 weight parts based on 100 weight parts of the poly(vinyl acetal) resin.

2. A laminated glass comprising an integral artifact consisting of at least a pair of class panels and, as interposed therebetween, an interlayer film for a laminated glass according to claim 1.

* * * * *